United States Patent
Zheng

(10) Patent No.: US 8,358,937 B2
(45) Date of Patent: Jan. 22, 2013

(54) SYSTEMS AND METHODS FOR REDUCING CLIPPING IN MULTICHANNEL MODULATED OPTICAL SYSTEMS

(75) Inventor: Jun Zheng, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 871 days.

(21) Appl. No.: 11/753,162

(22) Filed: May 24, 2007

(65) Prior Publication Data
US 2008/0292324 A1   Nov. 27, 2008

(51) Int. Cl.
*H04B 10/00* (2006.01)
*H01S 3/00* (2006.01)

(52) U.S. Cl. ........ 398/194; 398/192; 398/182; 398/130; 398/140; 398/128; 359/161; 359/187

(58) Field of Classification Search ............... 398/193, 398/182, 192
See application file for complete search history.

(56) References Cited

U.S. PATENT DOCUMENTS

| | | | |
|---|---|---|---|
| 4,242,636 A | 12/1980 | Gilmer et al. | |
| 4,710,723 A | 12/1987 | Pelchat et al. | |
| 5,027,402 A | 6/1991 | Richards et al. | |
| 5,090,291 A | 2/1992 | Schwartz | |
| 5,187,713 A | 2/1993 | Kwa | |
| 5,343,843 A | 9/1994 | Hamren | |
| 5,548,109 A | 8/1996 | Butturini et al. | |
| 5,600,472 A | 2/1997 | Uesaka | |
| 5,614,851 A | 3/1997 | Holzer et al. | |
| 5,661,580 A * | 8/1997 | Yamada | 398/76 |
| 5,680,238 A | 10/1997 | Masuda | |
| 5,689,356 A | 11/1997 | Rainal | |
| 5,694,386 A | 12/1997 | Hirajima et al. | |
| 5,751,531 A | 5/1998 | Rault | |
| 6,061,161 A | 5/2000 | Yang et al. | |

(Continued)

OTHER PUBLICATIONS

Pophillat, L., "Optical Modulation Depth Improvement in SCM Lightwave Systems Using a Dissymmetrization Scheme", IEEE Photonics Technology Letters, vol. 6, No. 6, Jun. 1994, pp. 750-753.

(Continued)

*Primary Examiner* — Shi K Li
*Assistant Examiner* — Oommen Jacob
(74) *Attorney, Agent, or Firm* — Grossman Tucker Perreault & Pfleger, PLLC; Norman S. Kinsella

(57) ABSTRACT

A system for reducing clipping may be used between a multichannel RF source and a laser to reduce or correct clipping that might occur in the laser as a result of negative spikes or peaks in a multichannel RF signal. The system generally includes a clipping correction circuit that receives the multichannel RF signal and responsive to the RF signal, prevents one or more of the negative peaks in the RF signal from causing clipping. The clipping correction circuit may either detect an envelope of the RF signal and/or may detect one or more peaks in the RF signal. One or more negative peaks may be prevented from causing clipping by adjusting a bias current provided by a bias control circuit and/or by modifying the RF signal with one or more clipping correction pulses coinciding with one or more negative peaks.

23 Claims, 10 Drawing Sheets

U.S. PATENT DOCUMENTS

| | | | |
|---|---|---|---|
| 6,118,479 | A | 9/2000 | Maeda et al. |
| 6,181,453 | B1 | 1/2001 | Darcie et al. |
| 6,211,984 | B1 | 4/2001 | Yoshida |
| 6,377,552 | B1 | 4/2002 | Moran et al. |
| 6,404,241 | B1 | 6/2002 | Ackerman |
| 6,549,316 | B2 | 4/2003 | Blauvelt |
| 6,559,994 | B1 | 5/2003 | Chen et al. |
| 6,727,761 | B1 | 4/2004 | Apel |
| 6,728,277 | B1 | 4/2004 | Wilson |
| 7,038,543 | B2 | 5/2006 | Nguyen et al. |
| 7,573,923 | B2 | 8/2009 | Zheng |
| 7,873,285 | B2 * | 1/2011 | Zhou et al. ............ 398/192 |
| 2002/0063930 | A1 * | 5/2002 | Blauvelt ................ 359/161 |
| 2003/0081667 | A1 * | 5/2003 | Camnitz et al. ........ 375/226 |
| 2003/0090289 | A1 | 5/2003 | Morley et al. |
| 2004/0056720 | A1 * | 3/2004 | Jansen et al. .......... 330/279 |
| 2004/0239428 | A1 | 12/2004 | Apel |
| 2006/0056327 | A1 | 3/2006 | Coersmeier |
| 2006/0078339 | A1 * | 4/2006 | Ng et al. ............... 398/195 |
| 2006/0208779 | A1 | 9/2006 | Lin et al. |
| 2009/0237171 | A1 | 9/2009 | Zheng et al. |

OTHER PUBLICATIONS

Ciciora, Walter; Farmer, James; Large, David; Adams, Michael, "Modern Cable Television Technology—Video, Voice, and Data Communications", Second Edition, Morgan Kaufmann Publishers, 2004, Chapter 12, pp. 530-557, and Glossary pp. 1003-1004.

PCT Search Report and Written Opinion received in related Application No. PCT/US08/64682 dated Jul. 22, 2008, 8 pgs.

PCT Search Report and Written Opinion received in related Application No. PCT/US08/64684 dated Jul. 23, 2008, 9 pgs.

US Office Action dated Aug. 6, 2008 received in related U.S. Appl. No. 11/775,409, 9 pgs.

U.S. Office Action dated Oct. 29, 2009 issued in related U.S. Appl. No. 11/753,082.

Office Action dated Jul. 8, 2010 received in U.S. Appl. No. 11/753,082, 15 pgs.

US Office Action dated Feb. 15, 2011 received in U.S. Appl. No. 11/753,082, 16 pgs.

US Office Action dated Feb. 18, 2011 received in U.S. Appl. No. 12/053,104, 29 pgs.

\* cited by examiner

SYSTEMS AND METHODS FOR REDUCING CLIPPING IN MULTICHANNEL MODULATED OPTICAL SYSTEMS

CROSS-REFERENCE TO RELATED APPLICATIONS

This application is related to U.S. patent application Ser. No. 11/753,082 entitled SYSTEMS AND METHODS FOR REDUCING CLIPPING IN MULTICHANNEL MODULATED OPTICAL SYSTEMS, which is filed concurrently herewith and fully incorporated by reference.

TECHNICAL FIELD

The present invention relates to modulated optical systems and more particularly, to a system and method for reducing or correcting clipping in multichannel modulated optical systems.

BACKGROUND INFORMATION

A laser may be used as an optical transmitter that transmits light at a given wavelength. The power (i.e., amplitude) of the laser light may be modulated by corresponding modulation of the power used to drive the laser. In a directly-modulated electrically pumped semiconductor laser such as a laser diode, the electrical current that drives or pumps the laser is modulated. The relationship between the light output and the input current for such a laser may be represented using a transfer curve or L-I (light-current) curve. The set point of the L-I curve may be selected so as to maximize the linearity of the laser output in response to the modulation, within the expected range of operation of the output produced by the laser. Although the laser output may be generally linear along a significant portion of the L-I curve, the light output may attain a zero-power level when the input current falls below a threshold current level, which results in an effect known as clipping.

In a communications system where multiple channels are transmitted, such as a CATV system, multiple analog signals corresponding to the multiple channels may be combined into a wide-band multichannel RF signal, which drives a laser to produce a multichannel modulated optical signal. The multiple analog signals may include multiple modulated analog carriers that may be combined, for example, using frequency division multiplexing techniques. One or more digital signals modulated using digital modulation, such as quadrature amplitude modulated (QAM), may also be combined with the modulated analog carrier signals, for example, using subcarrier multiplexing (SCM) techniques. In some systems, for example, as many as 110 channels may be transmitted over a frequency range of about 50 MHz to 750 MHz.

Because the modulation may carry several channels of information at different frequencies, there may be a very large swing of the input drive current in either direction. When many signals are summed and are randomly distributed in both frequency and phase, the ratio of peak-to-average voltage rarely exceeds 14 dB (though with occasional higher peaks). In a CATV system, however, the downstream spectrum is not random. Peak voltage conditions may occur, for example, when a large number of carriers are harmonics of a common root frequency and the carrier phases are aligned. In that case, the time domain waveform can resemble a string of impulses spaced by a time interval equal to the period of the common root frequency. As a result of this occasionally occurring peak voltage (and thus peak drive current) condition, the laser may be driven into hard limiting, causing clipping, when a sufficient number of carriers are in phase alignment. This is particularly true in the case of directly modulated laser diodes, as described above, where a sharp knee occurs in the transfer function below which the light output reaches a zero-power level.

In other words, there will be clipping when the instantaneous sum of various signals causes the drive current to swing too far in the "downward" direction and below the threshold current that turns on the laser. When such clipping occurs, intermodulation products (i.e., clipping-induced distortion) and noise may be generated, which may result in bit errors in the optical output of the laser. Systems including a digital signal (e.g., a QAM signal) added to the analog channels are even more sensitive to noise arising from clipping.

Each channel in a multichannel optical communications system may be driven or modulated up to a certain maximum optical modulation index (OMI). In general, a higher OMI per channel increases the channel-to-noise ratio (CNR). Driving the individual channels too much, however, may cause clipping when the channels line up, as described above. In some systems, each channel cannot be driven more than about 2 to 3% OMI because, if the channels were to line up, the total modulation of the laser would substantially exceed 100%. If clipping could be reduced or eliminated, increasing the OMI per channel would be possible to improve CNR.

Some systems for reducing or preventing clipping have used peak detection circuits to identify amplitude spikes that may result in clipping. When such peaks are detected, the RF drive signal is delayed and the laser bias is temporarily increased until the clipping event has passed. In such systems, however, the long RF delay between the peak detector circuit and the laser transmitter may be difficult to implement.

Other systems for reducing or preventing clipping have used peak detectors to detect peaks, to predict the subsequent peaks and to increase the bias current to reduce or prevent clipping in the subsequent peaks. One problem with this approach includes the difficulty of precisely setting the adjustment window so that it coincides exactly with the subsequent clipping events.

Other systems for reducing or preventing clipping have upconverted the RF signal, detected the envelope of the upconverted signal and used the detected envelope to adjust the laser bias. In such systems, however, an upconverter is required and the envelope detector is specifically designed for detecting an envelope of the upconverted RF signal.

BRIEF DESCRIPTION OF THE DRAWINGS

These and other features and advantages will be better understood by reading the following detailed description, taken together with the drawings wherein.

DETAILED DESCRIPTION

Figure 1:
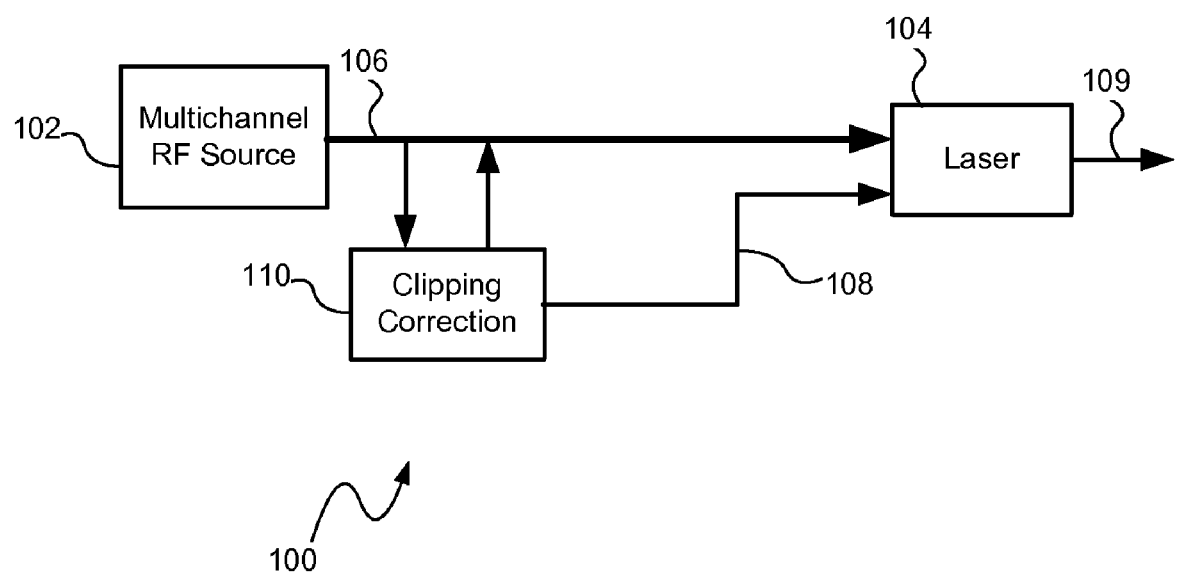
FIG. 1 is a functional block diagram of a system for reducing clipping in a multichannel modulated optical system, consistent with embodiments of the present invention.

Referring to FIG. 1, a system 100 for reducing clipping, consistent with embodiments of the present invention, may be used between a multichannel RF source 102 and a laser 104. The laser 104 may include a RF input that receives a multichannel RF signal 106, a bias current input that receives a bias current 108, and an optical output that produces a modulated optical signal 109 in response to the RF signal 106 and the bias current 108. The system 100 reduces or corrects clipping that might occur in the laser 104 as a result of negative spikes or peaks in the multichannel RF signal 106. As used herein, to reduce or correct clipping means to prevent one or more negative spikes or peaks in the RF signal 106 from causing clipping in the laser 104 and does not require a complete elimination of clipping.

The system 100 generally includes a clipping correction circuit 110 that receives the multichannel RF signal 106 from the RF source 102 and responsive to the RF signal 106, prevents one or more of the negative peaks in the RF signal 106 from causing clipping. As will be described in greater detail below, the clipping correction circuit 110 may either detect an envelope of the RF signal 106 and/or may detect one or more peaks in the RF signal 106. One or more peaks may be prevented from causing clipping by adjusting the bias current 108 and/or by modifying the RF signal 106 with one or more clipping correction pulses coinciding with one or more negative spikes following a detected peak.

The multichannel RF signal 106 may include multiple superimposed modulated analog carriers at different frequencies. The multiple modulated analog carriers may be modulated using modulation techniques known to those skilled in the art, such as amplitude modulation, and may be combined using multiplexing techniques known to those skilled in the art, such as frequency division multiplexing. The multichannel RF signal 106 may also include one or more digital signals modulated using digital modulation, such as quadrature amplitude modulation (QAM). The resulting multichannel RF signal 106 occupies a bandwidth across the range of frequencies of the multiple modulated carriers. Those skilled in the art will recognize that various modulation and multiplexing techniques may be used to generate the multichannel RF signal.

In one embodiment, the multichannel RF source 102 may include headend equipment in a CATV system and the multichannel RF signal 106 may be a downstream CATV signal. Examples of downstream multichannel CATV signals may include 77 channels transmitted over a frequency range of about 50 MHz to 550 MHz and 110 channels transmitted over a frequency range of about 50 MHz to 750 MHz. Each channel in a downstream multichannel CATV signal may include a video carrier, a color subcarrier and an audio carrier. Other types of signals and frequency ranges may also be transmitted.

In the exemplary embodiment, the multichannel RF signal 106, which occupies a bandwidth across the range of frequencies of the multiple modulated carriers, directly modulates the laser 104. Each channel in the multichannel RF signal 106 may be driven or modulated up to a certain optical modulation index (OMI) depending upon a desired channel-to-noise ratio (CNR). In one embodiment, the OMI of at least some of the channels may be at least about 4% and more specifically about 5%. When multiple modulated carriers of the multichannel RF signal 106 align in phase, the sum of the voltage of the aligned carriers may result in a peak voltage condition. When the optical modulation index (OMI) of each channel exceeds a certain level (e.g., exceeding about 3% OMI per channel), the peak voltage condition may result in a higher occurrence of negative voltage spikes or peaks that cause the laser input current to fall below a threshold current of the laser 104, resulting in clipping.

Figure 2A:
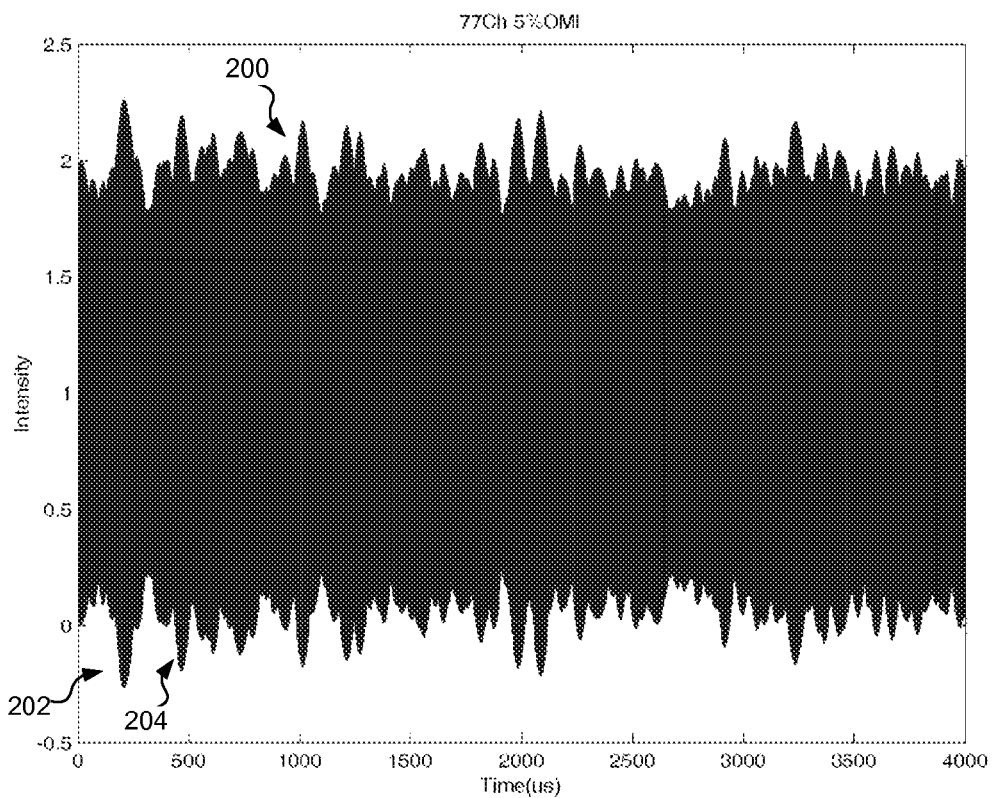
FIGS. 2A and 2B illustrate portions of an exemplary waveform of a multichannel RF signal in a multichannel modulated optical system.
Figure 2B:
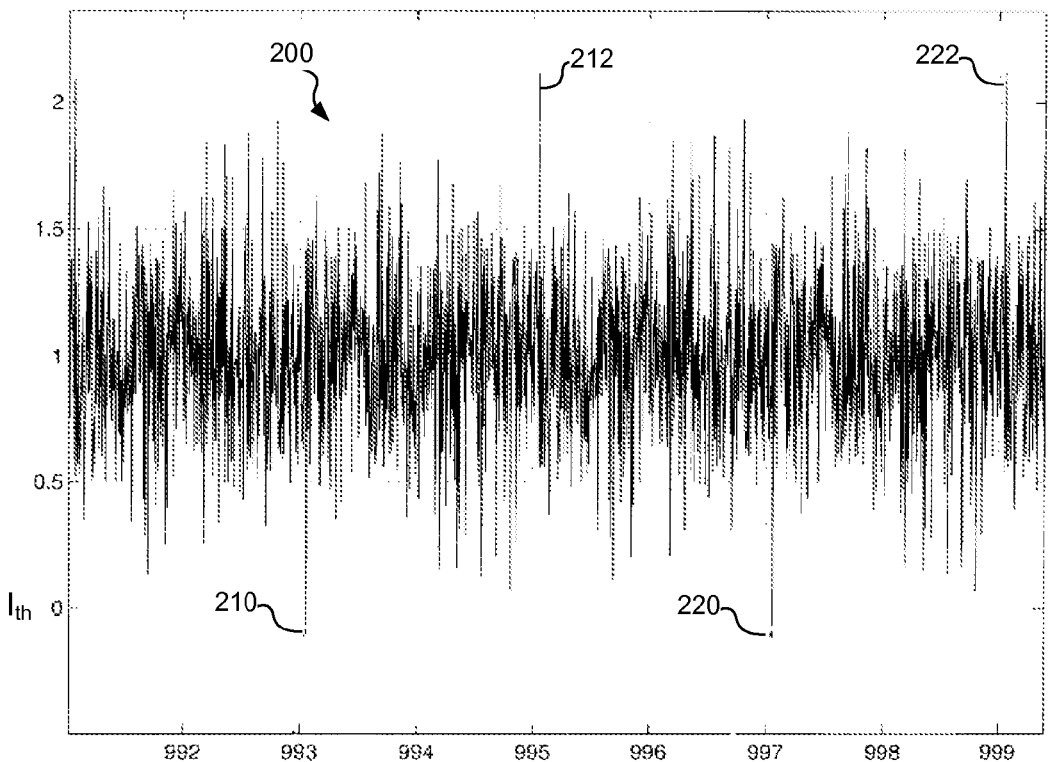

Referring to FIGS. 2A and 2B, an exemplary multichannel RF drive signal 200 is shown. The exemplary multichannel RF drive signal 200 represents 77 channels transmitted with 5% OMI per channel. FIG. 2A shows the RF drive signal 200 over a period of about 4000 µs with a number of peak voltage conditions 202, 204 during which multiple modulated carriers align in phase.

FIG. 2B shows the RF drive signal 200 over a smaller time period (i.e., about 10 µs) during a peak voltage condition. During the peak voltage condition shown in FIG. 2B, the multichannel RF drive signal 200 includes negative spikes or peaks 210, 220 that occur, for example, when carriers align to produce a relatively large swing in drive current in the negative direction. The negative spikes or peaks generally correspond to positive spikes or peaks 212, 222 produced by a corresponding relatively large swing in drive current in the positive direction. Clipping occurs when the negative spikes 210, 220 cause the drive current to fall below a threshold current ($I_{th}$) for the laser. In the exemplary RF drive signal 200, the negative peaks 210, 220 (and the resulting clipping) occur periodically during the peak voltage condition (e.g., about every 4 microseconds (µs)).

Figure 3:
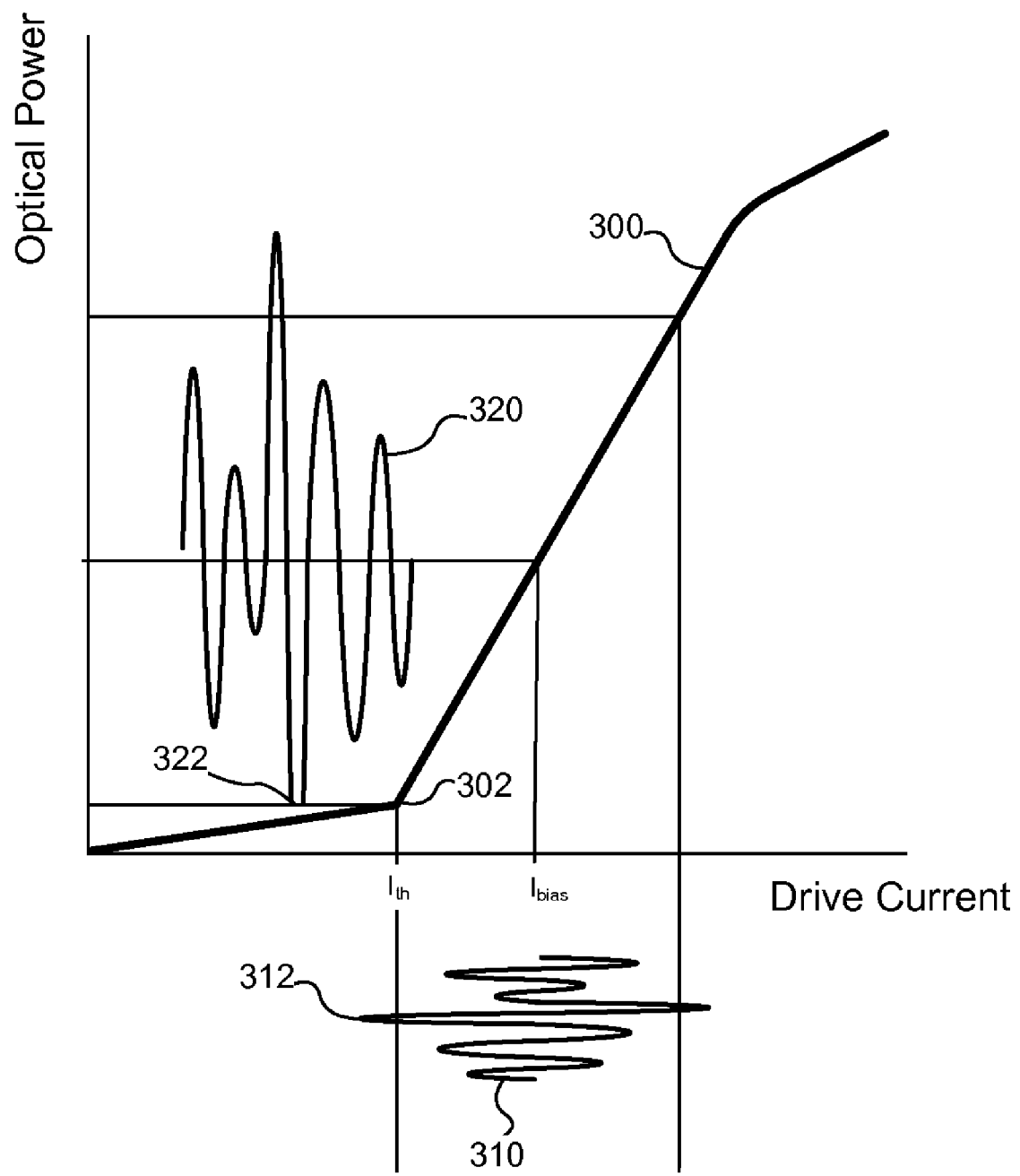
FIG. 3 illustrates a transfer curve showing the relationship between drive current and light output for a laser diode in which clipping occurs.

The laser 104 may include a semiconductor laser, such as a laser diode, having an L-I curve with a sharp knee or point at which the light output reaches a zero level when the input current falls below the threshold current ($I_{th}$). Referring to FIG. 3, a transfer curve 300 of one example of a laser diode illustrates the relationship between drive current (I) and light output (L) of a laser diode. RF signal input waveform 310 represents an RF input applied to the laser diode and optical output waveform 320 represents an optical output produced by the RF signal input. The point 302 (also referred to as the knee) of the transfer curve 300 represents a laser threshold point. When the drive current falls below a threshold current ($I_{th}$) corresponding to the laser threshold point, there is a sharp discontinuity in the light output. Thus, when the drive current of the RF signal input falls below the threshold current as represented by negative peak 312 in RF input waveform 310, the optical output abruptly stops as represented by the clipped peak 322 in the optical output waveform 320. As will be described in greater detail below, the clipped peak 322 may be prevented by increasing the bias current ($I_{bias}$) and/or by combining a clipping correction pulse with the RF signal coinciding with the negative peak 312 to prevent the peak 312 from falling below the threshold current ($I_{th}$).

Figure 4:
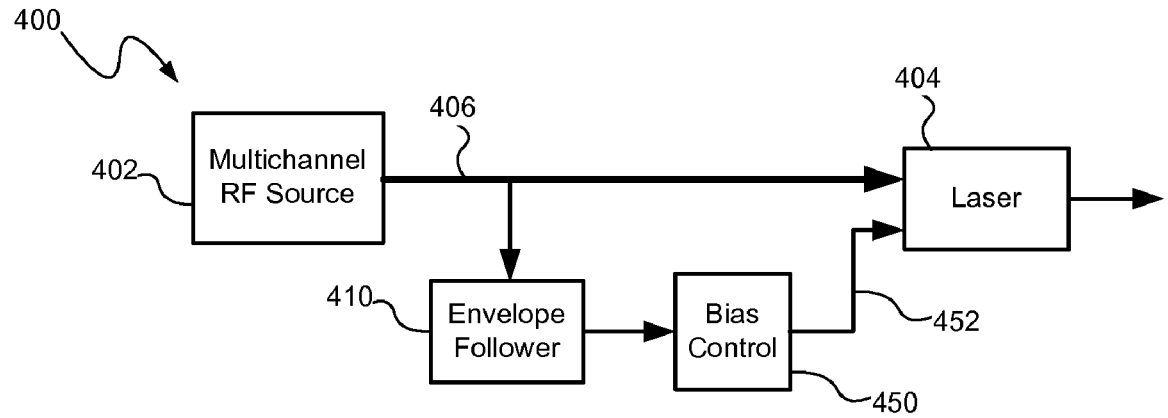
FIG. 4 is a schematic diagram of a system for reducing clipping, consistent with one embodiment of the present invention.

Referring to FIG. 4, an embodiment of a system 400 for reducing clipping may include an envelope follower 410 that receives a multichannel RF signal 406 from a multichannel RF source 402. The envelope follower 410 may be coupled to the RF signal path, for example, using a splitter (not shown), such that the RF signal 406 is provided to the envelope follower 410 and to the laser 404. The envelope follower 410 may detect an envelope of the multichannel RF signal 406 and may cause a bias control circuit 450 to adjust or vary a bias current 452 in response to the detected envelope. The bias current 452 may thus be continuously adjusted or varied to follow the detected envelope. In one embodiment, the bias current 452 may be adjusted or varied inversely proportional to a detected lower envelope of the multichannel RF signal 406. In particular, the bias current 452 may be increased as a lower envelope of the multichannel RF signal 406 decreases (indicating a peak voltage condition). Thus, when the multichannel RF signal 406 falls below the threshold current of the laser as a result of a negative peak, the bias current 452 should be increased to a level that will prevent that negative peak and/or subsequent negative peak(s) from causing clipping.

The multichannel RF signal 406 received by the envelope follower 410 includes multiple superimposed modulated carriers and occupies a bandwidth across a range of frequencies of the multiple modulated carriers, as described above. The envelope follower 410 may include envelope detection circuitry that has a response time fast enough to detect an envelope of a multichannel RF signal, such as the RF signal 200 shown in FIGS. 2A and 2B, having periodic peaks (e.g., every 4 µs). One example of envelope detection circuitry capable of detecting the envelope of such a signal is described in greater detail below. Those skilled in the art will recognize that the envelope flower 410 may also include conventional envelope detector or demodulator circuitry.

Figure 5A:
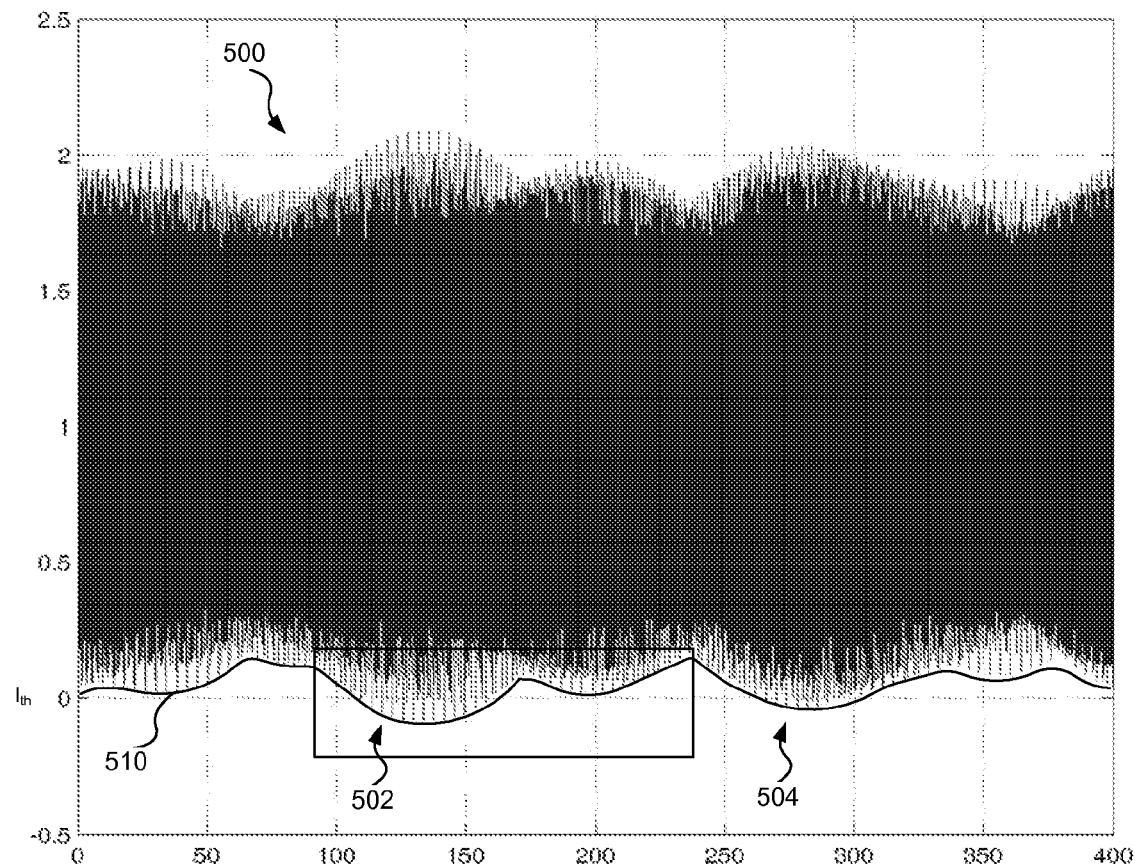
FIG. 5A illustrates a multichannel RF signal with an envelope detected using a system consistent with embodiments of the present invention.

FIGS. 5A illustrates an exemplary multichannel RF signal 500 and envelope 510 over a time period of about 400 µs. During portions 502, 504 of the RF signal 500, peak voltage conditions cause the input current to fall below a threshold current ($I_{th}$). The portions 502, 504 of the RF signal 500 may include a series of negative peaks below the threshold current ($I_{th}$). The negative peaks within the portions 502, 504 may occur generally periodically in the exemplary RF signal 500.

Figure 5B:
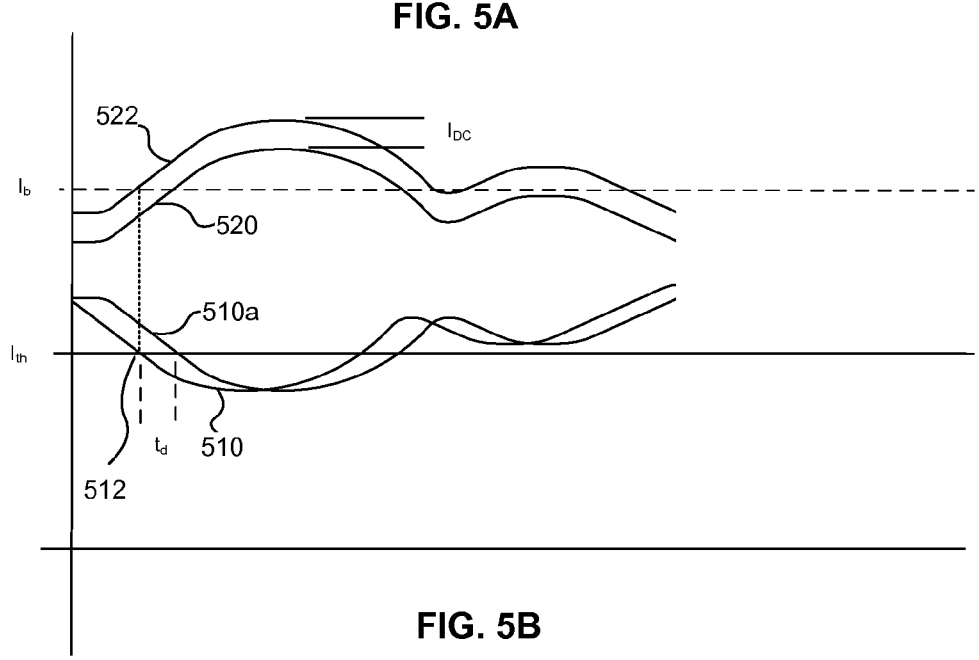
FIG. 5B illustrates a portion of the detected envelope from FIG. 5A together with a bias current responsive to the detected envelope, consistent with a further embodiment of the present invention.

FIG. 5B illustrates a detected lower envelope 510a for a section of the RF signal 500 together with the bias current 520 provided in response to the detected lower envelope 510a. As illustrated, when the detected lower envelop 510a decreases, the bias current 520 increases by a corresponding amount. In other words, the bias current 520 is inversely proportional to the detected lower envelope 510a. Thus, when the detected lower envelope 510a falls below the current threshold ($I_{th}$), the bias current 520 should be increased to a point that will prevent at least some of the subsequent negative peaks from falling below the threshold current at the input to the laser, thus reducing or correcting clipping. A bias current ($I_b$) may be determined to correspond to the bias current needed to provide required average optical power. The bias current 520 may thus be adjusted in response to the detected lower envelop 510a such that the bias current rises and falls relative to this bias current ($I_b$) in response to the detected lower envelope 510a falling and rising below and above the threshold current ($I_{th}$).

Because of the time required to detect the detected envelope 510a, a delay ($T_d$) exists between the detected envelope 510a and the actual envelope 510 of the RF signal 500. As a result of the delay, the change in bias current 520 may lag behind the RF signal 500 and may not prevent clipping caused by one or more initial peaks. For example, when the actual envelope 510 of the RF signal 500 falls below the threshold current ($I_{th}$) at point 512, the bias current 520 would not be at the threshold bias current ($I_b$) needed to prevent clipping at that point. To account for the delay, a DC offset ($I_{DC}$) may be applied to the bias current 520 to produce an offset bias current 522 that compensates for the delay ($T_d$). The DC offset corresponds to the delay ($T_d$) such that the offset bias current 522 is at the threshold bias current ($I_b$) when the actual envelope 510 falls below the threshold current ($I_{th}$) at point 512. The DC offset may be about 3% to account for a delay of about 10 µs.

Although the illustrated embodiment detects the lower envelope of the RF signal, a system for reducing clipping may also detect the upper envelope and adjust the bias current in proportion to the detected upper envelope because the waveform of the RF signal is generally symmetric. A DC offset may similarly be applied to the bias current provided in response to the detected upper envelope to account for any delay between the detected upper envelope and the actual RF signal.

Figure 6:
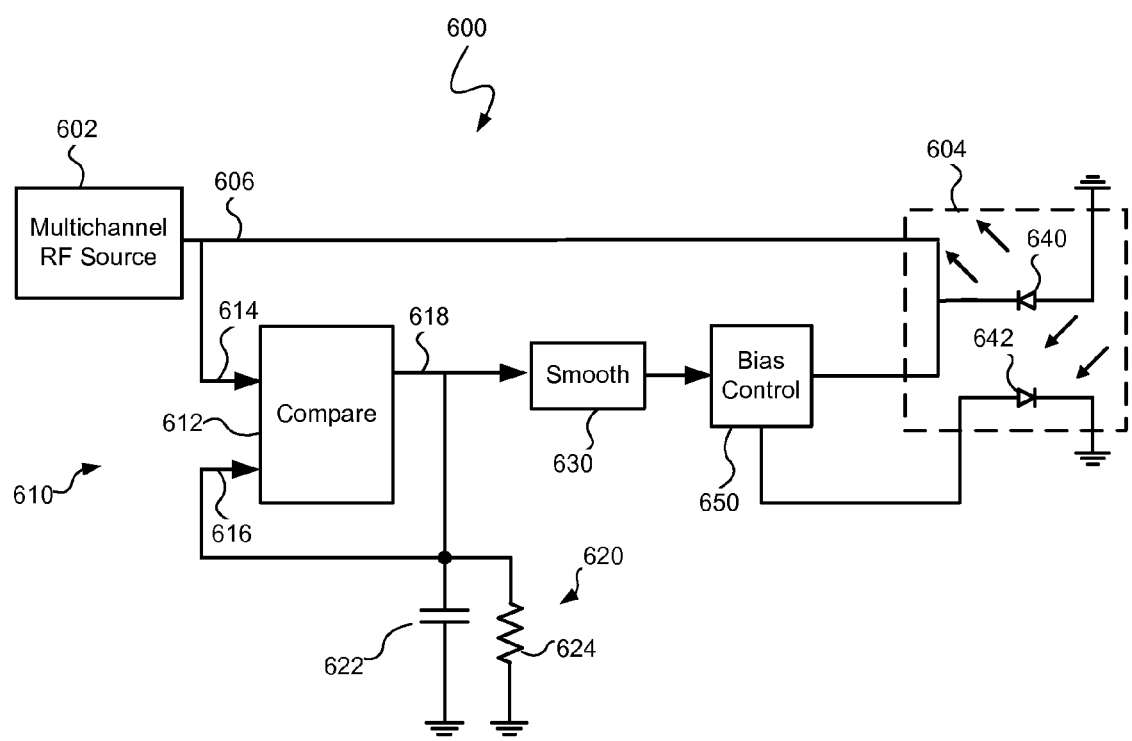
FIG. 6 is a schematic diagram of a system for reducing clipping, consistent with another embodiment of the present invention.

Referring to FIG. 6, another embodiment of a system 600 for reducing clipping is described in greater detail. In this embodiment, the envelope detector 610 may include a comparison circuit 612 that receives the RF signal 606 from the multichannel RF source 602. The comparison circuit 612 may include first and second inputs 614, 616 and an output 618. The RF signal 606 is provided to the first input 614 of the comparison circuit and the output 618 is fed back to the second input 616 of the comparison circuit 612. The output 618 of the comparison circuit 612 provides the larger magnitude of the first and second inputs 614, 616. Where a lower envelope is being detected, for example, the output of the comparison circuit 612 is the more negative amplitude. The comparison circuit 612 may be implemented, for example, using a precision rectifier including an operational amplifier.

The envelope detector 610 may also include a decay circuit 620 to provide a decay such that output of the comparison circuit 612 decays after the reaching a peak. The decay circuit 620 may include, for example, a capacitor 622 and resistor 624 coupled between the output 618 and the second input 616 of the comparison circuit 612. The output 618 of the comparison circuit 612 may then be provided to a smoothing circuit 630 including, for example, a low pass filter, which smoothes the output to produce the detected envelope.

Figure 7A:
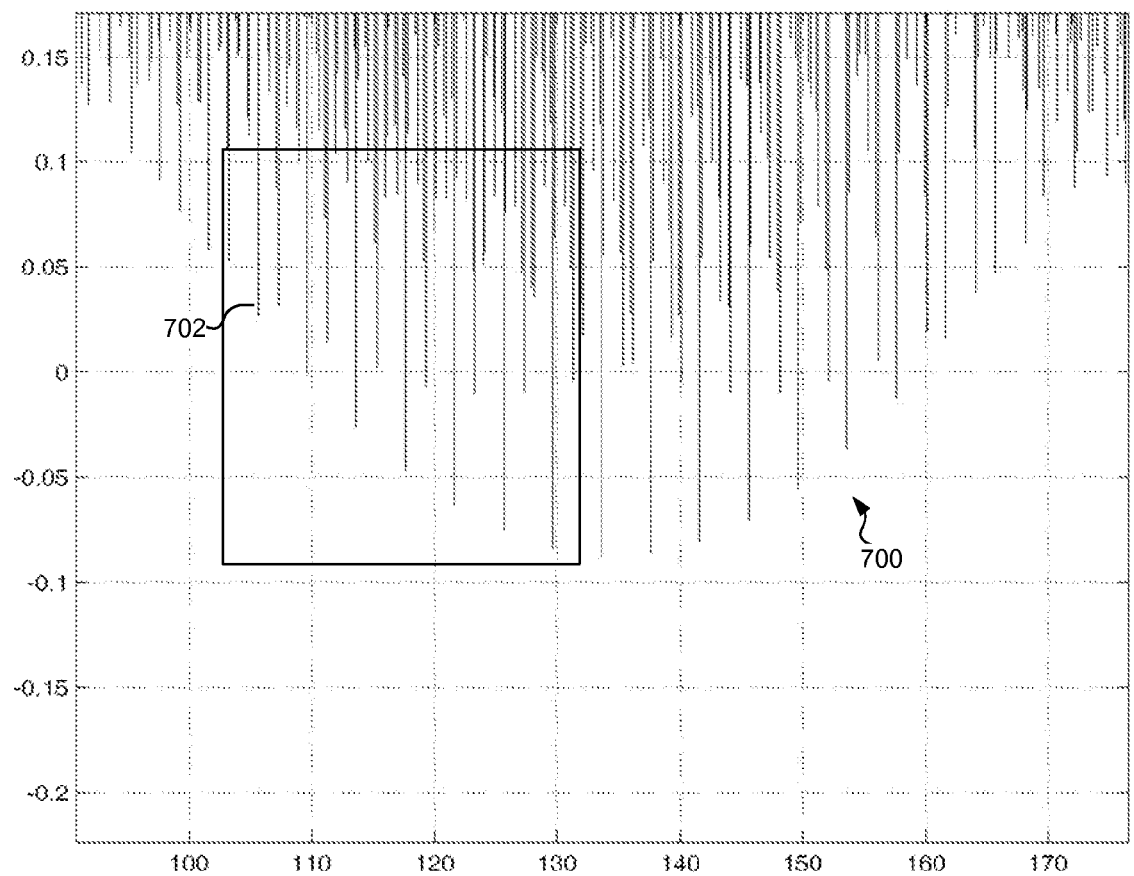
FIGS. 7A and 7B illustrate portions of a multichannel RF signal with an envelope detected by the system of FIG. 6.
Figure 7B:
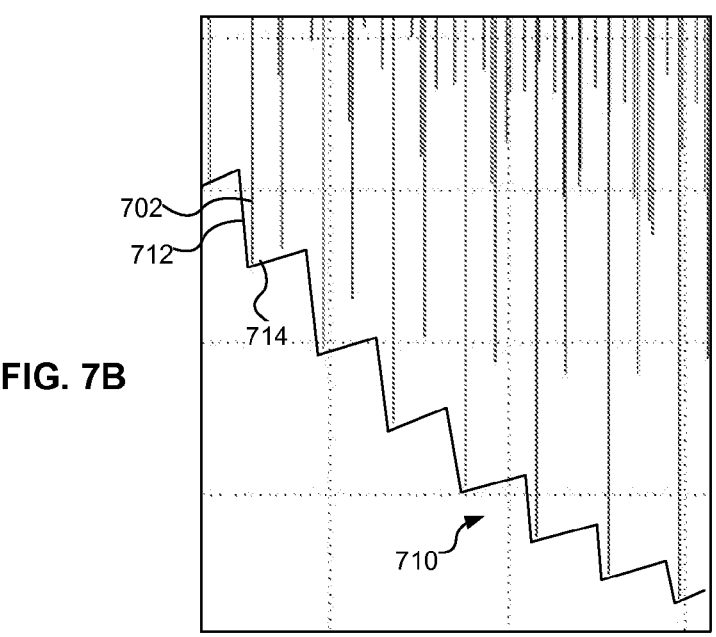

As shown in FIGS. 7A and 7B, for example, the plot 710 represents the output 618 of the comparison circuit 612 for a portion of an exemplary RF signal 700 received at the first input 614 of the comparison circuit 612. The portion of the exemplary RF signal 700 (enlarged in FIG. 7B) includes a series of negative peaks 702 of decreasing negative amplitude. The output 618 of the comparison circuit 612 decreases (e.g., along section 712) with the decreasing negative amplitude of the peak 702 and increases (e.g., along section 714) with the decay provided by the decay circuit 620. The output 618 (represented by the plot 710) may then be smoothed by the smoothing circuit 630 to produce the detected lower envelope of the RF signal 700.

The detected envelope may then be used to adjust or vary the bias current produced by the bias control circuit 650 to prevent one or more peaks from causing clipping in the laser 604, as described above. The bias control circuit 650 may adjust the bias current in addition to other bias control functions such as bias control in response to a monitored power output of the laser 604. As shown in the embodiment of FIG. 6, for example, the laser 604 may include a laser diode 640 and a monitoring photodiode 642 that provides a power output monitoring signal to the bias control circuit 650. The bias control circuit 650 may thus provide a bias current responsive to both the detected envelope and the power output monitoring signal.

Figure 8:
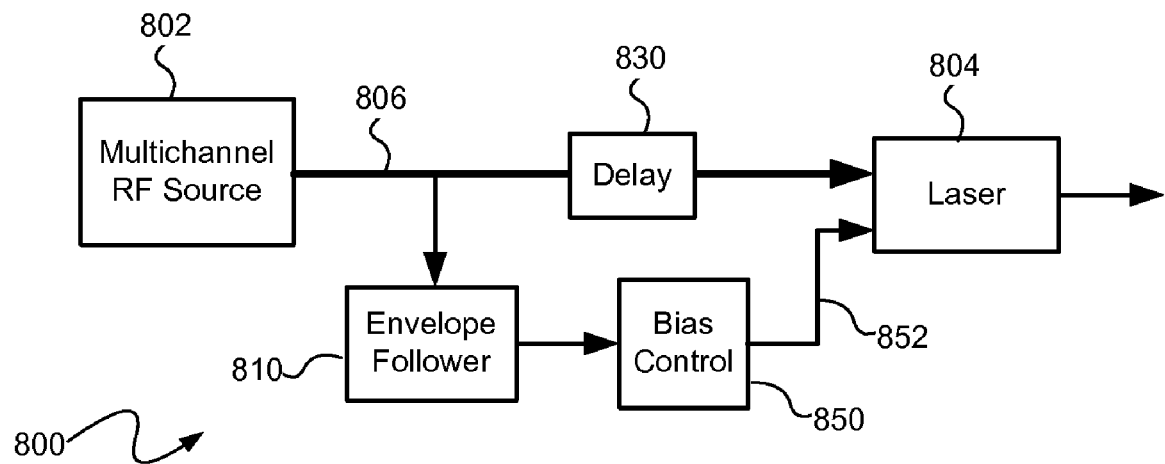
FIG. 8 is a schematic diagram of a system for reducing clipping including a delay, consistent with yet another embodiment of the present invention.

Referring to FIG. 8, other embodiments of a system 800 for reducing clipping may include a delay 830 in the path of the RF signal 806. The delay 830 delays the RF signal 806 prior to input to the laser 804 to minimize or reduce the lag time of the adjustments of the bias current 852. As discussed above in connection to FIG. 5B, the bias current 852 provided by the bias control circuit 850 in response to the envelope detected by the envelope follower circuit 810 will be delayed from and lag behind the actual envelope of the RF signal 806. The delay 830 may be used by itself, or in addition to the DC offset described above, to delay the RF signal 806 sufficient to reduce or effectively eliminate the lag between the varying bias current 852 and the RF signal 806 at the input to the laser 804. If the delay 830 is used in addition to the DC offset described above, the DC offset may be minimized.

Figure 9A:
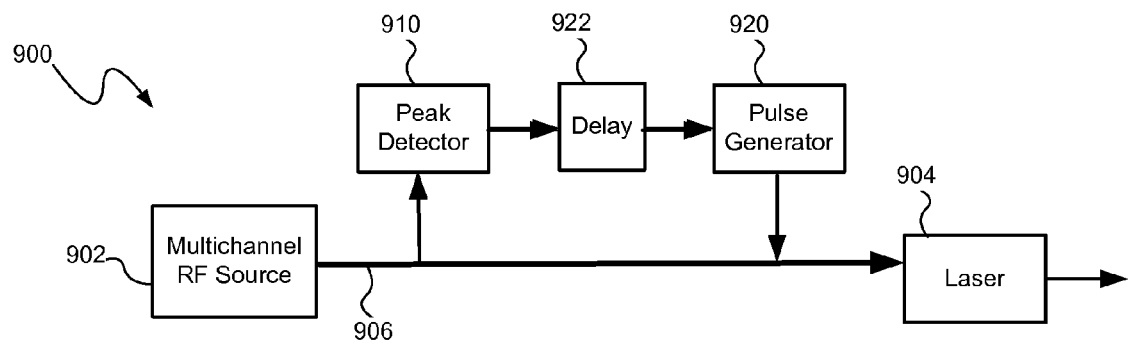
FIGS. 9A and 9B are schematic diagrams of systems for reducing clipping using one or more clipping correction pulses, consistent with further embodiments of the present invention.
Figure 9B:
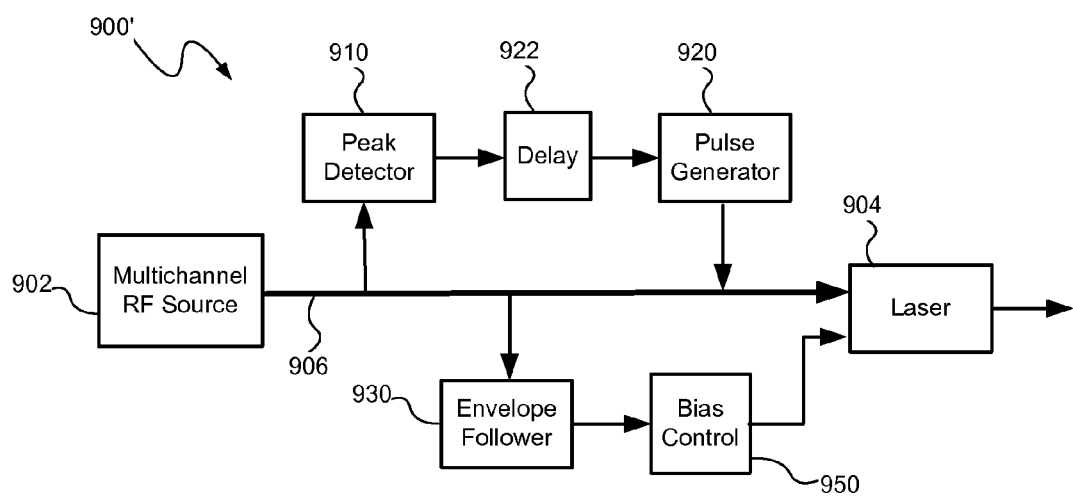

Referring to FIGS. 9A and 9B, further embodiments of a system 900, 900' for reducing clipping are described in greater detail. These embodiments of the system 900, 900' modify the RF signal 906 provided by the multichannel RF source 902 with one or more clipping correction pulses that coincide with one or more negative peaks or spikes in the multichannel RF signal 906 to increase the amplitude of those spikes and prevent those spikes from causing clipping at the laser 904. These systems 900, 900' may include a peak detector 910 for detecting peaks in the RF signal 906 and a pulse generator 920 for generating the clipping correction pulses and adding the clipping correction pulses to the RF signal 906 before the RF signal 906 is input to the laser 904.

The systems 900, 900' may also include a delay 922 for delaying the clipping correction pulses such that the clipping correction pulses coincide with one or more subsequent negative peaks that follow the detected peak. The delay 922 may be provided before triggering the pulse generator, for example, by using a delay line in the peak detector path between the peak detector 910 and the pulse generator 920. The delay 922 may also be integrated into the pulse generator 920, for example, as a digital timer/pulse generator that generates a specified pulse at a certain time after the peak detector 910 triggers the pulse generator 920. The delay 922 may provide a delay based on a typical interval (e.g., about 4 µs) between peaks that cause clipping. The interval may be determined, for example, from the period of a common root frequency of the carriers used to generated the multichannel RF signal. The delay 922 may also be adjustable for different systems in which clipping peaks occur at different period intervals.

The peak detector 910 may include peak detection circuits (e.g., analog or digital) known to those skilled in the art for detecting peaks in a multichannel RF signal (e.g., peaks that occur in a multichannel CATV signal). The peak detector 910 detects peaks that fall below or exceed some peak detection threshold. The peak detection threshold may correspond to the threshold current that causes clipping or may correspond to some percentage of the threshold current.

The pulse generator 920 may include pulse generator circuitry known to those skilled in the art for generating a pulse wide enough (e.g., 0.1 µs) to avoid having high frequencies that might cause clipping or interfere with the RF signal. In contrast to adjusting the bias current, a clipping correction pulse provides a narrower, tailored increase in current added to the RF signal, instead of an increase in current that is spread out over a long period of time. The pulse generator 920 may generate a series of clipping correction pulses at a predefined interval once the pulse generator 920 is triggered by an initial detected peak. The interval of the pulses may correspond to the interval between the clipping peaks (e.g., about 4 µs). The pulse generator 920 may also generate a single clipping correction pulse in response to each detected peak.

As illustrated in FIG. 7A discussed above, the negative peaks or spikes may increase in magnitude (i.e, increase negative amplitude) following the initial peak that would cause clipping (i.e., the detected peak). The pulse generator 920 may generate fixed amplitude pulses sufficient in amplitude to prevent all subsequent peaks from causing clipping. In other words, the fixed amplitude of all of the pulses may be sufficient to prevent the negative peak with the greatest negative amplitude from causing clipping. The pulse generator 920 may also generate clipping correction pulses having amplitudes proportional to the amplitudes of the detected peaks. The pulse detector 910 may provide the pulse generator 920 with information regarding the amplitude of the detected peaks such that the pulse generator 920 generates pulses with amplitudes that vary according to the peaks detected.

Figure 10A:
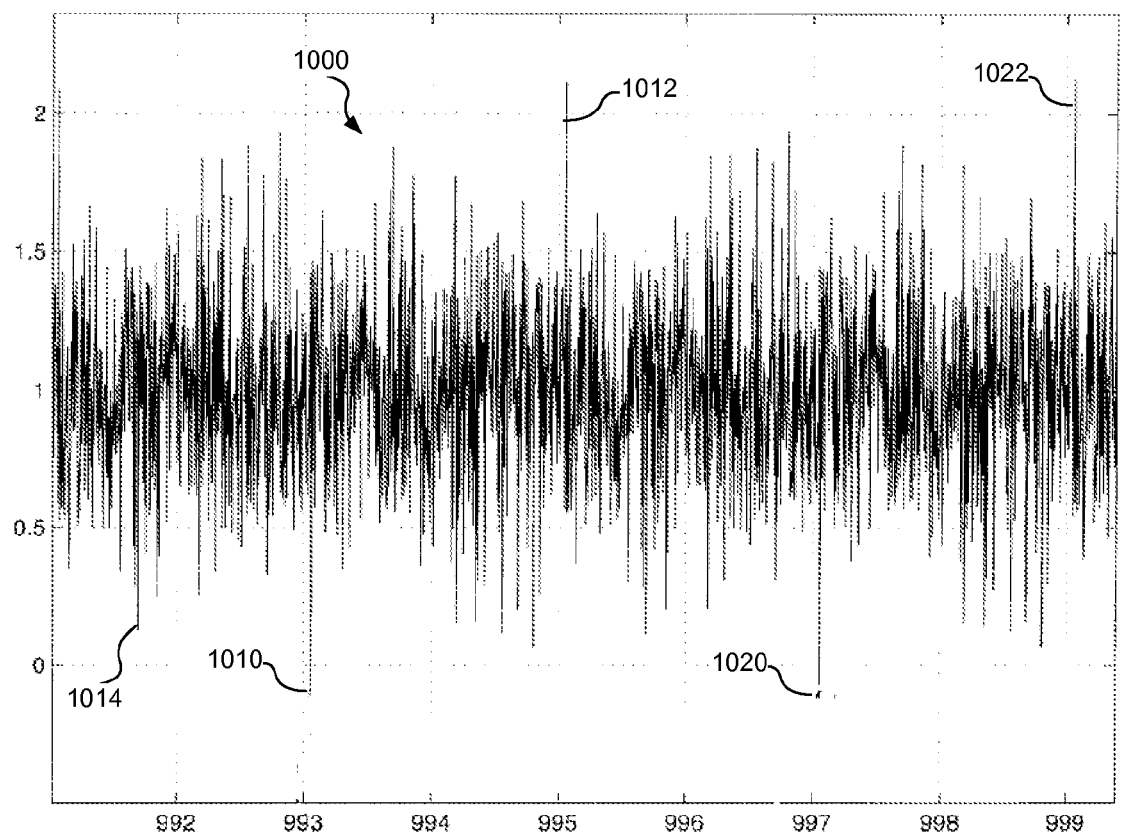
FIGS. 10A-10C illustrate a multichannel RF signal and clipping correction pulses generated to reduce clipping caused by the multichannel RF signal.
Figure 10B:
Figure 10C:

Referring to FIGS. 10A-10C, the operation of the systems 900, 900' is described in connection with an exemplary RF signal 1000. FIG. 10A shows a portion of the exemplary RF signal 1000 including negative peaks 1010, 1020 that fall below the threshold current and corresponding positive peaks 1012, 1022. FIGS. 10B and 10C show clipping correction pulses 1050, 1050a, 1050b generated in response to detection of a peak and combined with the RF signal 1000 to correct clipping.

According to one embodiment, the peak detector 910 may detect an initial negative peak 1010 that would cause clipping and the pulse generator 920 may generate one or more clipping correction pulses 1050 in response to the detected negative peak 1010. The delay 922 delays the pulse(s) 1050 to coincide with the subsequent one or more negative peaks 1020. The clipping correction pulse 1050 thus increases the amplitude of the RF signal 1000 at the time of the next negative peak 1020 to prevent that peak 1020 from causing clipping.

According to another embodiment, the peak detector 910 may detect an initial negative peak 1014 that falls below a peak detection threshold other than the threshold current. The initial negative peak 1014 detected by the peak detector 910, for example, may have a magnitude that is some percentage (e.g., 80%) of a peak that would cause clipping. The pulse generator 920 may thus be triggered by this negative peak 1014 that occurs before the initial negative peak 1010 causing clipping, allowing a series of clipping correction pulses 1050a, 1050b to prevent clipping caused by the initial negative clipping peak 1010 as well as the subsequent negative clipping peaks 1020.

According to a further embodiment, one or more positive peaks 1012, 1022 on the positive side of the RF signal 1000 may also be detected by the peak detector 910 and used to trigger the pulse generator 920 instead of or in addition to detecting the negative peaks 1010, 1014, 1020. Because of the symmetry of the RF signal 1000, as shown in FIG. 10A, when negative peaks occur (e.g., about every 4 µs), corresponding positive peaks occur (e.g., about 2 µs later). The peak detector 910 may thus detect positive peaks above a given threshold and trigger the pulse generator 920 to generate one or more clipping correction pulses 1050 (e.g., starting 2 µs later).

The peak detector 910 and pulse generator 920 may be used as the sole clipping correction circuit, for example, as shown in the system 900 in FIG. 9A. The peak detector and pulse generator 920 may also be used together with an envelope follower 930 and bias control 950 to provide clipping correction, for example, as shown in the system 900' in FIG. 9B. In the system 900', the bias current is varied following the detected envelope of the RF signal 906, as described above, while clipping correction pulses are added to the RF signal 906.

Accordingly, systems and methods may reduce clipping by either varying the bias current in response to a detected envelope of a multichannel RF signal and/or by combining one or more clipping correction pulses with the RF signal. The systems and methods for reducing clipping may be implemented, for example, without requiring a long delay in the RF signal path and without requiring upconversion of the RF signal.

Consistent with one embodiment, a system is provided for reducing clipping in a modulated optical system. The system includes a laser including an RF input configured to receive a multichannel RF signal and an optical output to provide a modulated optical signal in response to the multichannel RF signal. The multichannel RF signal including a superposition of multiple modulated carriers and occupying a bandwidth across a range of frequencies of the multiple modulated carriers. The system also includes a peak detector configured to receive the multichannel RF signal and to detect at least one peak in the multichannel RF signal. The system further includes a pulse generator coupled to the peak detector. The pulse generator is configured to generate at least one clipping correction pulse in response to a detected peak and to combine the clipping correction pulse with the multichannel RF signal after a delay such that the clipping correction pulse coincides with a subsequent negative peak in the multichannel RF signal following the detected peak and prevents the subsequent negative peak in the multichannel RF signal from causing clipping.

Consistent with another embodiment, a method is provided for reducing clipping in a modulated optical system. The method includes receiving a multichannel RF signal, the multichannel RF signal including a superposition of multiple modulated carriers and occupying a bandwidth across a range of frequencies of the multiple modulated carriers; detecting at least one peak in the multichannel RF signal; generating at least one clipping correction pulse in response to detecting the peak; combining the at least one clipping correction pulse with the multichannel RF signal such that the at least one clipping correction pulse coincides with at least one subsequent negative peak following the detected peak; providing the multichannel RF signal combined with the at least one clipping correction pulse to a laser; and providing a modulated optical signal output from the laser.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for reducing clipping in a modulated optical system, the system comprising:
a laser including an RF input configured to receive a multichannel RF signal and an optical output to provide a modulated optical signal in response to the multichannel RF signal, the multichannel RF signal including a superposition of multiple modulated carriers and occupying a bandwidth across a range of frequencies of the multiple modulated carriers;
a peak detector configured to receive the multichannel RF signal and to detect at least one peak in the multichannel RF signal; and
a pulse generator coupled to the peak detector, the pulse generator being configured to generate a series of clipping correction pulses in response to at least one detected peak and to combine the clipping correction pulses with the multichannel RF signal, wherein consecutive clipping correction pulses in the series of clipping correction pulses are spaced at an interval corresponding to an interval between consecutive negative peaks in the multichannel RF signal such that the clipping correction pulses coincide with a corresponding series of subsequent negative peaks in the multichannel RF signal and increase an amplitude of the RF signal at the time of respective ones of the corresponding series of subsequent negative peaks to prevent the subsequent negative peaks in the multichannel RF signal from causing clipping when the laser receives the multichannel RF signal combined with the clipping correction pulses.

2. The system of claim 1 further comprising a delay element configured to provide a delay before triggering the pulse generator, wherein the delay is based on an interval between peaks in the multichannel RF signal that cause clipping.

3. The system of claim 1 wherein the pulse generator includes a digital timer configured to provide a delay before generating at least one of the clipping correction pulses, wherein the delay is based on an interval between peaks in the multichannel RF signal that cause clipping.

4. The system of claim 1 wherein the multichannel RF input signal occupies a bandwidth over a frequency range of about 50 MHz to 1000 MHz.

5. The system of claim 1 wherein the pulse generator is configured to generate the series of clipping correction pulses following an initial detected peak.

6. The system of claim 1 wherein the peak detector is configured to detect a plurality of peaks in the multichannel RF signal and wherein the pulse generator is configured to generate each clipping correction pulse in the series of clipping correction pulses in response to and following a respective detected peak of the plurality of detected peaks.

7. The system of claim 1 wherein the peak detector is configured to detect a negative peak that falls below a peak detection threshold, and wherein the pulse generator is configured to generate the series of clipping correction pulses following a detected negative peak that falls below the threshold.

8. The system of claim 7 wherein the peak detection threshold corresponds to a threshold current that causes clipping.

9. The system of claim 7 wherein the peak detection threshold corresponds to a percentage of a threshold current that causes clipping.

10. The system of claim 1 wherein the peak detector is configured to detect at least one positive peak, and wherein the pulse generator is configured to generate the series of clipping correction pulses following at least one detected positive peak.

11. The system of claim 1 wherein each of at least some of the multiple modulated carriers have an optical modulation index (OMI) of at least about 4%.

12. A method of reducing clipping in a modulated optical system, the method comprising:
receiving a multichannel RF signal, the multichannel RF signal including a superposition of multiple modulated carriers and occupying a bandwidth across a range of frequencies of the multiple modulated carriers;

detecting at least one peak in the multichannel RF signal;

generating a series of clipping correction pulses in response to detecting the at least one peak, wherein consecutive clipping correction pulses in the series of clipping correction pulses are spaced at an interval corresponding to an interval between consecutive negative peaks in the multichannel RF signal;

combining the series of clipping correction pulses with the multichannel RF signal such that the series of clipping correction pulses coincide with a corresponding series of subsequent negative peaks, and wherein the clipping correction pulses increase an amplitude of the RF signal at the time of respective ones of the corresponding series of subsequent negative peaks;

providing the multichannel RF signal combined with the series of clipping correction pulses; and providing a modulated optical signal output from the laser.

13. The method of claim 12 further comprising providing a delay after detecting the at least one peak before generating at least one of the clipping correction pulses, wherein the delay is based on an interval between peaks in the multichannel RF signal that cause clipping.

14. The method of claim 12 wherein detecting the at least one peak includes detecting at least one negative peak that falls below a peak detection threshold.

15. The optical system of claim 14 wherein the peak detection threshold corresponds to a threshold current of the laser.

16. The method of claim 14 wherein the peak detection threshold corresponds to a percentage of a threshold current of the laser.

17. The method of claim 12 wherein detecting the at least one peak includes detecting at least one positive peak that exceeds a peak detection threshold.

18. The method of claim 12 wherein detecting the at least one peak includes detecting an initial detected peak and wherein the series of clipping correction pulses is generated following the initial detected peak.

19. The method of claim 18 wherein the amplitude of the series of clipping correction pulses is fixed such that the clipping correction pulses are capable of preventing the series of subsequent negative peaks from causing clipping.

20. The method of claim 12 wherein generating the series of clipping correction pulses includes generating at least one clipping correction pulse having an amplitude proportional to an amplitude of the detected peak.

21. The method of claim 12 wherein detecting the at least one peak includes detecting a plurality of peaks, and wherein generating the series of clipping correction pulses in response includes generating each clipping correction pulse in the series of clipping correction pulses in response to and following a respected detected peak of the plurality of detected peaks.

22. The method of claim 12 wherein the series of clipping correction pulses includes pulses with a pulse width of about 0.1 µs.

23. The system of claim 1 wherein the pulse generator is configured to generate the series of clipping correction pulses with a pulse width of about 0.1 µs.

* * * * *